United States Patent [19]
Sayers

[11] 3,771,592
[45] Nov. 13, 1973

[54] MATRIX AND METHOD OF MAKING SAME
[75] Inventor: James A. Sayers, Toledo, Ohio
[73] Assignee: Owens-Illinois, Inc., Toledo, Ohio
[22] Filed: Aug. 16, 1971
[21] Appl. No.: 171,881

[52] U.S. Cl................... 165/10, 65/33, 65/DIG. 7, 161/68, 161/69
[51] Int. Cl............................................ F28d 19/04
[58] Field of Search.................. 165/10; 65/DIG. 7, 65/33; 161/68, 69

[56] References Cited
UNITED STATES PATENTS

| | | | |
|---|---|---|---|
| 3,372,735 | 3/1968 | Meijer.............................. | 165/10 X |
| 3,392,776 | 7/1968 | Topouzian....................... | 165/10 X |
| 3,482,622 | 12/1969 | Bracken, Jr. et al. ............ | 165/10 X |
| 3,556,636 | 1/1971 | Roberts et al. .................. | 65/DIG. 7 |
| 3,549,468 | 12/1970 | Messineo et al. ................. | 161/68 |
| 3,582,301 | 6/1971 | Andrysiab et al.................. | 65/33 |
| 3,607,185 | 9/1971 | Andrysiab....................... | 65/DIG. 7 |

Primary Examiner—Albert W. Davis, Jr.
Attorney—E. J. Holler et al.

[57] ABSTRACT

Disclosed is an improved assembly or matrix in which a plurality of open-ended, glass-ceramic tubes are disposed in axially parallel relation. The tubes are rigidified into a matrix structure, with the tubes being integrally bound to each other at their tube contact areas. Additional glass-ceramic material at and just below the surface of the matrix structure and arranged in a predetermined pattern across the open-ended face of the matrix integrally binds together the surfaces of the tubes facing the interstices between the tubes. That portion of the pattern overlying the open ends of the tubes fills the tube openings. The additional glass-ceramic material thus provides a wear resistant, matrix-reinforcing surface, a control of the porosity of the matrix structure, and a control of the flow pattern through the matrix. The invention also comprehends the method of reinforcing a matrix of this type by interposing a finely divided, thermally crystallizable frit or other forms of low expansion crystallizable glass between and in the open ends of individual, matrix-defining glass tubes in a predetermined pattern across the open-ended face of a matrix structure and thermally processing the frit or other form of crystallizable glass to convert the frit or other material to low-expansion, glass-ceramic material of substantially the same thermal expansion characteristics as the matrix structure and to fusion bond the frit or other material to the matrix structure.

9 Claims, 16 Drawing Figures

Patented Nov. 13, 1973

INVENTOR
JAMES A. SAYERS
BY E.J. Holler &
Charles S. Lynch
ATTORNEY

INVENTOR
JAMES A. SAYERS

ATTORNEY

INVENTOR
JAMES A. SAYERS

MATRIX AND METHOD OF MAKING SAME

BACKGROUND OF THE INVENTION

This invention constitutes an improvement over the structures and methods disclosed in the application of Y. K. Pei, Ser. No. 30,859, filed in the U.S. Patent Office on Apr. 22, 1970, and in the application of Marion I. Gray, Jr., both assigned to the assignee of the present invention.

In the above-noted application of Pei, there is disclosed an assembly or matrix of integrally fused tubes useful as a compact regenerative heat exchanger, buoyancy material, sound absorption material, heat insulation material, and the like. The advantages of this type of structure and the requirements for each of the structures of this type, particularly a regenerator structure, are set forth fully in the Pei application and need not be repeated here.

In the Pei application, there is disclosed a regenerator structure which consists of a plurality of individual, axially parallel, open ended glass-ceramic tubes which are thermally bonded to one another and integrated into an overall regenerator structure. Gas flow through the regenerator occurs through the individual tubes, one open end of each tube forming an inlet and the other open end of the tube forming the outlet. In a typical thermal regenerator installation, one or both faces of the regenerator is contacted by a seal bar. The regenerator matrix is rotated relative to the seal bar which is urged against the regenerator end surface under an appreciable axial load. Because of matrix end face-seal bar contact under the sealing load, some abrasive wearing of the matrix end face may well occur over an extended service period, particularly since the matrix end face is defined by the open ends of the individual tubes. Additionally, the strength of the matrix and its ability to withstand axially or radially applied loads in operation is dependent upon the degree of integral bonding between adjacent tubes. While matrices made in accordance with the disclosure of the Pei application are capable of functioning as regenerators or other structures disclosed therein, any increase in the resistance of the matrix end faces to wear and any increase in the strength of the matrix itself was welcomed.

In the Gray application, there is disclosed a matrix structure similar to that disclosed in the Pei application, but having the dual characteristics of increased structural strength and increased abrasion resistance at the open end faces of a matrix. That dual improvement was accomplished by reinforcing the matrix with a low expansion thermally crystallizable glass which is interposed in the interstices between the tubes. The interposed material serves to bond the tubes to one another and to provide a wear resistant reinforcement at the seal-engaging surfaces of the matrix by insuring that the tube walls at the open ends thereof are supported by the interposed material or by an adjacent tube wall.

While matrices made in accordance with the disclosure of the Gray application function very well as regenerators or other structures disclosed therein, it is desirable to increase the resistance of the matrix end faces to wear with a less expensive and complex process, and while so reinforcing the matrix end face be able to control the porosity of and flow patterns through the matrix.

SUMMARY OF THE INVENTION

The present invention provides a matrix similar to that disclosed in the Pei and Gray applications, but having the characteristics of increased abrasion resistance at the open end faces of a matrix along with porosity and flow pattern control.

These improvements are accomplished by reinforcing the matrix face with a low expansion thermally crystallizable glass which is selectively laid in a desired pattern across the face of the matrix. This deposited material serves to bond the tubes ends to one another and to fill the tube ends under the deposited material to provide a wear-resistant, tube-reinforcing surface or surfaces for the seal-engaging surfaces of the matrix.

In a preferred embodiments of the method taught herein, a glass-ceramic matrix of the type disclosed in the Pei application is reinforced by depositing a finely divided, thermally crystallizable frit in a predetermined, open network pattern in the open ends of and between individual, matrix-defining glass tubes covered by the pattern after the thermal conversion of the tubes to a glass-ceramic. Subsequently, the thermally crystallizable frit is thermally processed through successive nucleating and crystallizing steps to convert the frit to low expansion glass-ceramic material having substantially the same thermal expansion characteristics as that of the tubes defining the matrix. During this subsequent thermal processing, the thermal sintering of the frit integrates the tube-frit pattern assembly into a single mass. After the nucleation and crystallizing steps have been carried out, the faces of the matrix may be ground to provide a seal-engaging surface which mates with a particular seal configuration. The sintered frit is interposed between and in the ends of the tubes covered by the pattern, and serves to provide an additional, wear-resistant surface for the matrix assembly.

It is, therefore, an important object of this invention to provide a matrix structure or similar assembly of improved strength and wear-resistance properties by incorporating into the surface of the matrix a pattern of glass-ceramic material having thermal expansion characteristics compatible with that of the glass-ceramic tubes forming the primary matrix structure.

Another important object of this invention is the provision of a method of making a reinforced glass-ceramic matrix by the steps of assembling a plurality of individual, closed-end tubes of thermally crystallizable glass-ceramic material, thermally processing the tubes to convert the tubes to a low expansion glass-ceramic integral matrix structure, selectively laying down thermally crystallizable ceramic material in an open network pattern on an open-ended face of the matrix structure, and thermally processing the selectively disposed ceramic material of the pattern to convert the selectively disposed ceramic material to a ceramic material fusion bonded to the matrix structure and having substantially the same thermal expansion characteristics as the matrix structure.

Yet another, and no less important, object of this invention is the provision of a method for reinforcing a matrix structure formed from a plurality of tightly packed individually axially elongated tubes arranged with their axes parallel and the tube walls fusion bonded to each other to form an integral mass by interposing between the tubes and in the open ends thereof a thermally crystallizable frit distributed in an open network pattern across the open-ended face of the matrix, and successively nucleating and crystallizing to convert the frit to a ceramic having substantially the same thermal expansion characteristics as the matrix and fusion bonded in the open ends of and between tubes covered by the pattern.

Other objects, features and advantages will become apparent from the following description taken in conjunction with the accompanying drawings, in which:

DESCRIPTION OF THE PREFERRED EMBODIMENTS

Figures 1, 3:
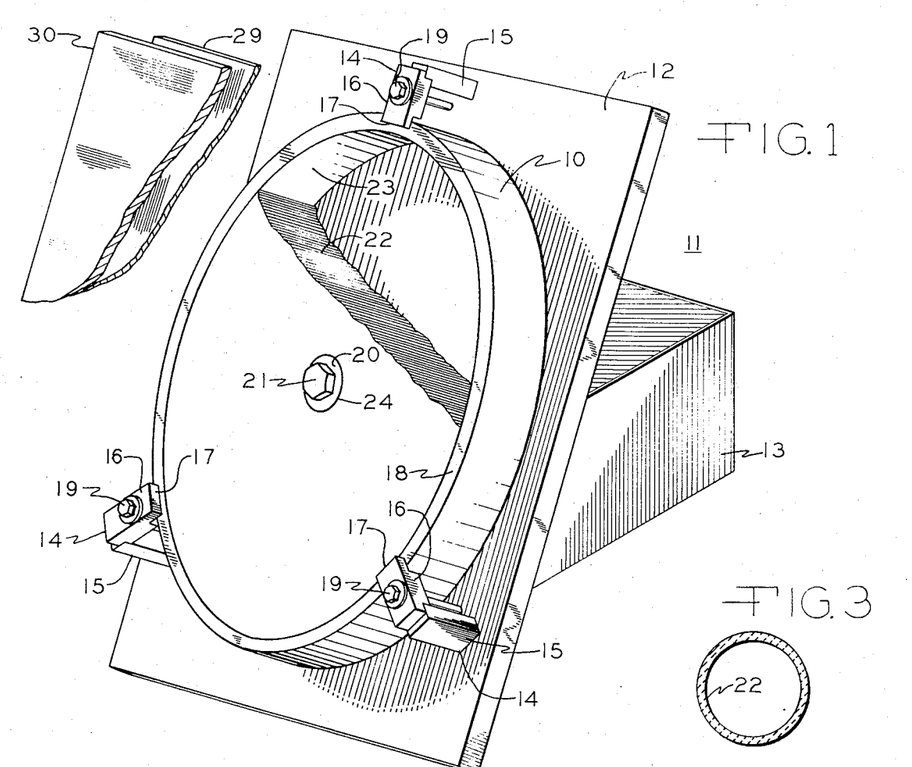
FIG. 1 is a perspective view of a jig assembly utilized in making an embodiment of the structure of the invention and showing a partial packing of tubes within the structure mounted on the assembly.
FIG. 3 is an enlarged cross-sectional view of the glass tube taken along lines III—III of FIG. 2.

As shown in the drawings, FIG. 1, reference number 10 refers generally to an apparatus which is substantially identical to that apparatus illustrated in FIG. 1 of the above-identified application of Y. K. Pei As illustrated in FIG. 1, a ceramic rim 10 is mounted on a jig 11 comprising a face board 12 attached to a conventional vibrator 13. Three clamping means 14 are spaced about the edges of face board 12 and removably secure the rim 10 thereto. Each of clamping means 14 comprise a stem portion 15 fastened to the face board, an arm portion 16 disposed at right angles to the stem portion 15 and provided with a finger portion 17 in contact with the upper edge 18 of rim 10. Arm portions 16 are held in engagement with the rim 10 and the stem portion 15 by fastening means 19 passing through arm portion 16 and secured to the face board 12.

A hub 20 may be also removably mounted on the face board 12 and disposed at the center of the rim. Fastener 21 passing through the hub 20 is secured to the face board 12 and maintains the hub in position on the jig. A plurality of hollow, thin-walled thermally crystallizable glass tubes 22 are then closely packed together with the rim in parallel relationship as illustrated in FIG. 1, i.e., the tubes are parallel to the inner wall 23 of the rim and the outer wall 24 of the hub and the longitudinal axes of the tubes are essentially parallel.

Figure 2:
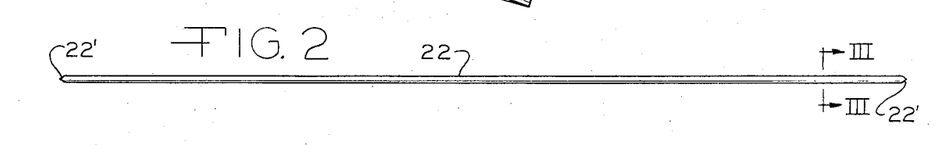
FIG. 2 is a side view of a glass tube used in making the structure of this invention.

Each of the glass tubes 22 shown in FIGS. 1, 2 and 3 have both ends 22' sealed, thus trapping air or another thermally expansible fluid medium therein. A tube 22 may have its ends sealed by simply passing the tube end through a flame. Due to the very small size of the tube, the outer diameter of which may, for example, be about 0.030 inches and the wall thickness may be about 0.001 to 0.003 inches, end sealing is readily achieved. However, the method of sealing the tubes is not a part of this invention, and any of the known methods may be usd.

Figure 5:
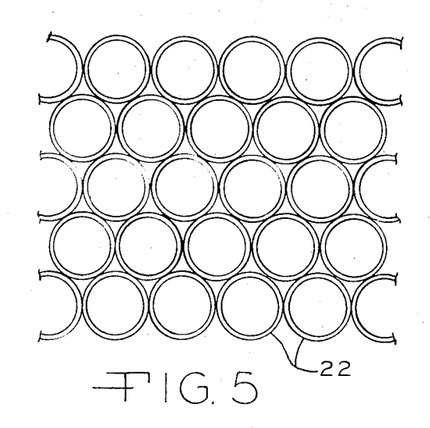
FIG. 5 is a sectional view of a portion of the bundle of tubes of the invention, greatly enlarged, showing the arrangement of the glass tubes prior to being expanded by heat treatment.

Because it is often desirable and important to have the glass tubes 22 as closely packed as possible so that each tube is in contact with six other tubes, as shown in FIG. 5, the jig 11 is provided with a vibrator 13 which, in turn, causes face board 12 and rim 10 to vibrate (by means not shown). This vibration is imparted to the plurality of glass tubes 22 and assists in more closely packing the tubes as they are placed on top of the tubes which have already been packed. It is to be understood that the rim 10 need not be manually packed, but can be packed by other methods. In either event, the vibration imparted to the glass tubes should be sufficient to ensure the close, tight packing of the tubes within the rim, with each tube in contact with six other tubes.

Figure 4:
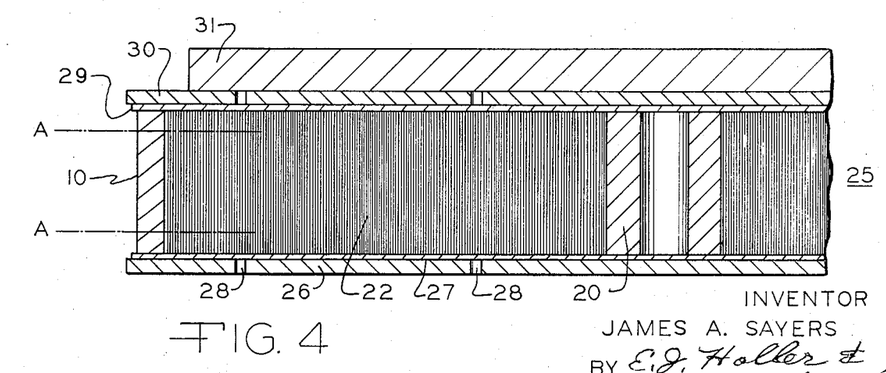
FIG. 4 is a partial cross-sectional view of the structure of FIG. 1 placed within an assembly prior to heat treatment.

The assembly 25 comprising the rim 10, hub 20 and the closely-packed glass tubes 22 is removed from the jig 11 and placed upon a stainless steel plate 26 having a silica-alumina (Fiberfrax) cloth 27 on its upper surface, as shown in FIG. 4. Plate 26 is provided with a plurality of perforations 28. Another silica-alumina cloth 29 is placed on the upper surface of the assembly 25, and a second perforated stainless steel plate 30 is placed thereover. A heavy member 31 is finally placed on top of plate 30, and the entire assembly is then placed in a furnace and subjected to heat sufficient to soften the glass walls of tubes 22 and cause the walls to bloat or expand due to the heating of the fluid medium in each tube so that adjoining, contacting wall surfaces are fused together to form a unitary matrix.

It is important to have the ends of each of the tubes 22 in assembly 25 sealed during the heating step, otherwise the tube walls will collapse rather than expand when subjected to this heat. Furthermore, to utilize the heating procedure described above with respect to the FIG. 4 assembly, the length of the tubes should be no longer than the height of the rim 10. As the individual tubes expand, any air or other gases which remains in the interstices passes through the perforations in the plates 26 and 30. If desired, plates 26 and 30 need not be perforated, and the assembly can be placed under vacuum during the heating step to assist in the removal of any air which is within the interstices between the tubes.

The heating of the thin-walled tubes expands them into close contact with each other and into the interstices between tubes to a greater or lesser extent, ideally to an extent to substantially completely fill the interstices between the tubes and between the tubes and walls of the rim and hub. In the latter event the resulting tubes become essentially hexagonal. The glass tubes are fusing together where they contact. The tubes are fusing together and are also undergoing nucleation during the heat treatment, and heating of the structure is continued for a time sufficient to in situ crystallize the glass tubes to an at least partially crystalline material, commonly referred to as a glass-ceramic.

The rim and hub can be formed of a conventional inorganic crystalline oxide ceramic, made by firing and sintering particulate inorganic oxide materials. The rim and hub should have an average coefficient of lineal thermal expansion compatible with that of the low expansion material of the matrix. In a one embodiment of the invention, the rim and hub are also formed of a thermally crystallizable glass which has been crystallized to a glass-ceramic having physical properties, including thermal expansion and contraction properties, which are close to, and usually the same as, those of the crystalline matrix comprising the fused tubes.

After the assembly 25 has been crystallized, and usually after cooling to room temperature, the outer surface portions of the assembly may be removed by sawing with a diamond saw in the direction indicated by lines A in FIG. 4. An assembly of a predetermined thickness is thus obtained, and all of the fused tubes now have open channels since both sealed ends of each tube have been cut away.

In the method of this embodiment of the invention, the ends 22' of tubes 22 are appropriately sealed, e.g., by means of a flame, either before, after, or during the bundling of the tubes. Typically, the tubes are sealed in a gaseous environment, so as to trap the environmental gas within each tube at the surrounding ambient pressure. On heating to effect fusion sealing, the gas within each tube expands so as to prevent collapse of the tubes. With the thin-walled tubes used in this invention, expansion of the entrapped gas causes the tubes to bloat or expand.

Figure 6:
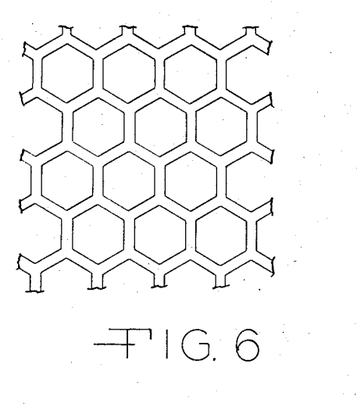
FIG. 6 is a sectional view of a portion of the bundle of tubes of the structure of the invention, greatly enlarged, showing the arrangement of the glass tubes after they have been expanded and crystallized by heat treatment.

In a preferred embodiment the expansion is effected until the space between adjacent tubes is essentially filled. When the tubes are bundled so that each tube is in contact with six adjacent tubes, as shown in FIG. 5, the tubes are reformed into substantially hexagonal shape to provide the matrix structure illustrated in FIG. 6. The tube expansion may be stopped short of full hexagonal development, but the wall-to-wall pressure created by even minimal expansion of the tubes has been found effective to form tube-to-tube seals which are sufficiently tenacious to knit the entire aggregate into an integral, unitary structure of good mechanical properties. Conversely, open tubes without internal pressure acting upon each tube will collapse or deform under the influence of gravity where high temperatures soften the glass enough to cause tube-to-tube bonding.

Tubing used in practicing the usual embodiments of the method of this invention have maximum inner diameters of up to about 0.1 inch, wall thicknesses of 0.001 to 0.003 inch and inside diameter to wall thickness ratios of at least 6; substantially lower inside diameter to wall thickness ratios may result in a relative ineffectiveness of the process to urge the tubes into a good fusion bond when using a temperature schedule which is also effective to properly nucleate and crystallize the glass tubes to a glass-ceramic during the expanding and fusion heating cycle. In a now preferred embodiment of the invention the ratio of the inner diameter to the wall thickness of the thermally crystallizable glass tubes is at least 7.2; when tubes having such diameter to wall thickness ratio are employed, the unique structure of the invention is made wherein the open frontal or cross sectional area of the resulting matrix structure is at least 60 percent, and may be on the order of 85 percent or more.

Usually, round thermally crystallizable glass tubing is used in forming the matrix structure of the invention. Drawing of round glass tubing to controlled dimensions is an old, established art in industry.

While the assembled tubes 22 can merely be fusion sealed with slight expansion and reformation of the tubes, it is preferred for most applications that the tubes be expanded and reformed into the substantially hexagonal shape during fusion sealing. Greater tube-to-tube pressure is generated causing a more perfect fusion of each tube to the surrounding tubes and tube-to-tube contact area increases from essentially tangential contact with adjacent tubes to essentially full contact, with bonding of the entire periphery of the tubes. Furthermore, as the "triangular" space between each set of three adjacent tubes (see FIG. 5) is substantially reduced in area by expansion and reformation, the pressure drip in the finished product across the honeycomb structure is less than across one in which tubing is round in the final product. The thinner the wall thickness for a given composition and the greater the ratio of the inner diameter to such a wall thickness, the more readily the tube can be expanded to a substantially hexagonal tube at a given temperature.

In the application of Gray, a matrix of the type disclosed in the Pei application is reinforced by interposing a finely divided, thermally crystallizable frit or other thermally crystallizable material between the individual, sealed, matrix-defining glass tubes prior to the thermal conversion of the tubes to a glass ceramic. Subsequently, the thermally crystallizable frit or other sinterable material and the individual tubes are jointly thermally processed through successive nucleating and crystallizing steps to simultaneously convert both the tubes and the frit to low expansion glass-ceramic materials having substantially the same thermal expansion characteristics. During this joint thermal processing, the internal pressures generated in the closed tubes and the thermal sintering of the frit combine to compact and to integrate the tube-frit assembly into a single mass. After the nucleation and crystallizing steps have been carried out, the ends of the tubes may be ground or cut off to provide a flow-through matrix through the now opened ends of the tube. The frit is interposed between the ground or cut open ends of the tubes, and serves to reinforce the ends of the tubes and to provide an additional, wear-resistant surface for the matrix assembly.

Figure 7:
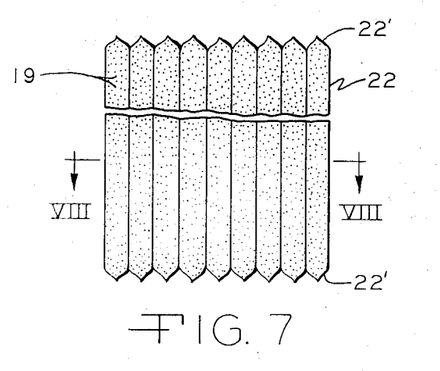
FIG. 7 is an enlarged view of a portion of assembled tubes from a bundle, the tubes being coated with a thermally crystallizable frit.
Figure 8:
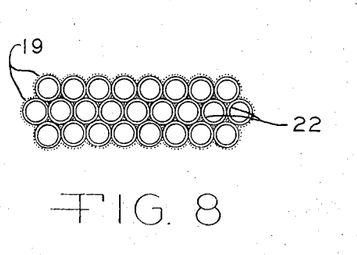
FIG. 8 is a cross-sectional view of the tubes illustrated in FIG. 7, the section being taken along lines VIII—VIII of FIG. 7.
Figure 9:
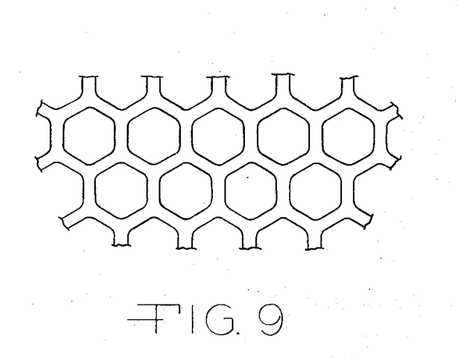
FIG. 9 is a view of the tubes illustrated in FIG. 7 formed into an open end matrix structure.

As shown in FIGS. 7 and 8, each of the glass tubes 22 is coated with a sinterable frit to carry out the method of the Gray application. The frit 19 interposed in the interstices between the tubes is subjected to substantial pressures generated by the expansion of the tubing walls. The resultant sintering, melting, and distribution of the frit will adhere the tube walls to one another and to its own sintered glass-ceramic mass. The open end face of a matrix is shown in FIG. 9 which is formed from bundles of tubing shown in FIGS. 7 and 8. The tube walls in FIG. 9 are therefore insured of support by another tube wall or by the sintered frit in the interstices.

While the matrix made according to the Gray application performs very well, particularly where substantial radially directed load forces are involved, it is desirable to be able to reinforce the seal engaging surface of a matrix by a method which requires less reinforcing material and less time and labor in the assembling of the matrix to reduce the cost accordingly. Moreover, it is desirable in certain applications of the matrix to be able to control the porosity and the flow pattern through the matrix.

Figure 10:
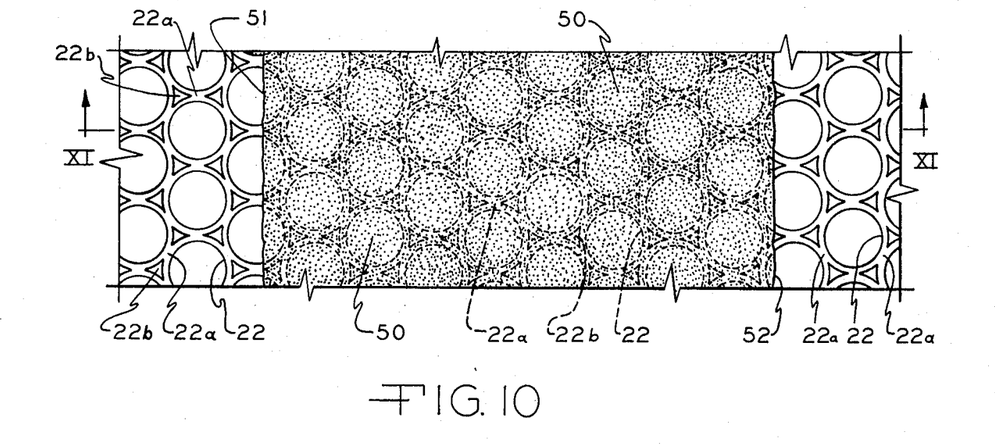
FIG. 10 is a top plan view, greatly enlarged, of a portion of a matrix taken from the apparatus of FIG. 4 showing application of reinforcing material according to the teachings of this invention.
Figure 11:
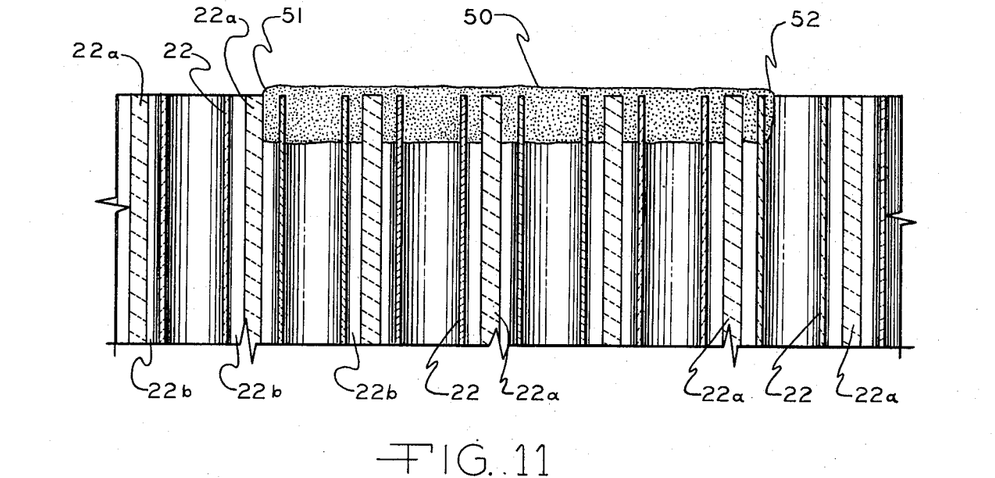
FIG. 11 is a cross-sectional view of the matrix portion shown in FIG. 10, the section being taken along lines XI—XI of FIG. 10.
Figure 12:
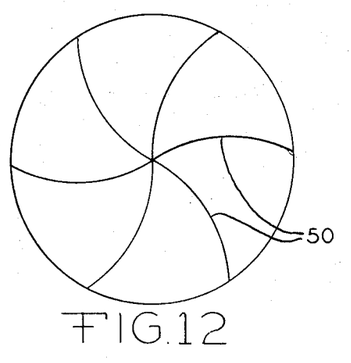
FIGS. 12, 13, 14, 15 and 16 are plan views of matrix structures showing diagrammatically aternative patterns of application of reinforcing material in accordance with the method illustrated in FIGS. 10 and 11.

Referring to FIGS. 10 and 11 there is shown top plan and sectional views, greatly enlarged, of a tube bundle portion from a matrix structure taken from between lines A of FIG. 4. The matrix structure may have been subjected to a first or "unified" heat treatment process in which the assembly of FIG. 4 is taken from ambient to final crystallization temperature with no interruption in the process. Alternatively, the matrix may have been subjected to a second or "two step" heat treatment process in which a first step bloats or expands and fusion bonds the tubes into a unitary or integral mass. The assembly is then cooled somewhat or even cooled to room temperature and the ends of the tubes are ground or cut away and opened to atmospheric pressure. The assembly is then heated again in a second step of the process into the final crystallization heat treatment range, where further crystallization is effected.

The matrix structure chosen for illustrating the teachings of this invention is one in which there has been sufficient bloating in the heat treatment process to expand adjacent tube walls into a fusion bond with each other, but the tubes have not been reformed into an essentially hexagonal shape. This structure enables an easier identification and description of interstices between tubes in the matrix. It is to be understood, however, that the teachings herein are also applicable to a matrix structure in which the tubes have been reformed to the hexagonal shape, leaving no interstices or very, very small interstices between the tubes.

In FIGS. 10 and 11 the tubes 22 have been expanded to form an integral mass by the fusion bonding of tube wall portions 22a leaving interstices 22b between the tubes 22. A paste or slurry 50 of low expansion crystallizable frit carried in a liquid vehicle such as amyl acetate with 1.2 percent nitrocellulose is mixed with a ratio of solids to vehicle which will advantageously keep the paste or slurry from flowing freely.

The paste 50 is then applied to an open end face of the matrix between border lines 51 and 52. An enlarged application area is shown in FIGS. 10 and 11. FIGS. 12, 13, 14, 15 and 16 show diagrammatically alternative open network patterns of applications of paste 50 to the open end face of a matrix. The choice of pinwheel, grid, radial spokes, concentric circles, and spiral patterns, respectively, or a combination of patterns, is made dependent upon the characteristics of the seal bar which will engage the open end face of the matrix, the seal bar facing material, rotation speed of the matrix, the pressure exerted by the seal bar on the matrix face, the matrix porosity desired, the desired flow pattern through the matrix, etc.

The area covered by the paste patterns may be defined by templates, by control of the movement of a paste depositing mechanism, by use of a silk-screen type process, or simply by manually covering the area outside the paste pattern with a masking medium such as tape.

Depending upon the solids to vehicle ratio there will be some natural flow of the paste 50 from the surface of the matrix into the open ends of the tubes 22 and into the interstices 22a (if any), as shown in FIG. 11. If this penetration is insufficient, if the paste 50 is thick, or if it is desired to insure that the top of the paste pattern is even with the top of the tubes, then the paste may be mechanically urged into the open tube ends and interstices by roller, brush, or the like mechanisms, or by hand.

After the solvent portion of the vehicle has evaporated and the binder portion of the vehicle has set up enough to give the paste patterns green-ware handling properties, the template or masking medium may be removed (if used) and the matrix with the paste pattern thereon is placed in a furnace.

The matrix and the paste pattern is then thermally processed to convert the frit to a low expansion ceramic material which is fuse bonded to and is a part of the face of the matrix. The ceramic pattern areas then provide wear resistant surface areas, and a control of the porosity and flow through the matrix.

The paste patterns may be rolled or otherwise finished so that the pattern does not extend above the original open end surface of the matrix. Alternatively, the paste patterns may be left extending slightly above the surface. After firing, the ceramic pattern may be left projecting above the matrix surface to prevent seal bar contact with the original matrix face, or the ceramic pattern may be surface ground down to the original surface level or to conform with the configuration of a mating seal bar element.

The thermally crystallizable frit is preferably a finely divided ceramic material (200 mesh in one example), which will have very low thermal expansion characteristics after thermal processing. It is preferred that the final thermal expansion characteristics be substantially the same as that of the matrix to which is applied. It is also preferred that both the matrix and pattern materials be of a composition which can be thermally processed through successive nucleation and crystallization stages to a low expansion glass ceramic. The matrix structure may be one which has already been processed to substantially complete crystallization before paste pattern application, or may be one which has been partially processed through nucleation and initial crystallization. In the latter case the matrix structure may be jointly processed with the paste pattern to substantially complete crystallization.

Well suited for use in the method of this invention are thermally crystallizable glasses that are convertible by heating to glass-ceramic bodies. As used herein, a glass-ceramic is an inorganic, essentially crystalline oxide ceramic material derived from an amorphous inorganic glass by in situ bulk thermal crystallization.

Prior to thermal in situ bulk crystallization, the thermally crystallizable glasses can be drawn into tubing using conventional glass forming techniques and equipment. After being assembled in the manner shown in FIGS. 1 and 4, the thermally crystallizable glass tubes are subjected to a controlled heat treatment until the tubes have been expanded and fusion sealed and at least initial crystallization has been effected.

Thermally crystallizable glass compositions and the glass-ceramics resulting from thermal in situ crystallization thereof which are useful in the method and product of this invention are those which have, in their crystallized state, a coefficient of thermal expansion in the range from $-18$ to $+50 \times 10^{-7}/°C$ over the range $0°$–$300°C$. The compositions usually used are those containing lithia, alumina and silica, together with one or more nucleating agents including $TiO_2$, $ZrO_2$, $SnO_2$, or other known nucleating agents. In general, such compositions containing in weight percent about 64 to 79 $SiO_2$, about 13 to 25 $Al_2O_3$ and about 2 to 6 $Li_2O$, together with about 1.2 to 4 weight percent of nucleating agents selected from one or more of $TiO_2$, $ZrO_2$ and $SnO_2$, can be employed. Preferably, not more than about 2.5 weight percent $TiO_2$ is usually used or the crystallization is undesirably rapid to be compatible with the fullest expansion of the tubes in the bloating process.

Other ingredients can be present in small amounts, as is understood in the art, such as even as much as 4 or 5 weight percent ZnO, up to as much as 3 or 4 weight percent CaO, up to as much as 8 percent MgO, and up to as much as 5 percent BaO, so long as the silica plus alumina plus lithia and the nucleating agent(s) are at least about 85, usually 90, weight percent of the total glass and the glass composition will thermally crystallize to a glass-ceramic having the desired low expansion of $-18$ to $+50 \times 10^{-7}/°C$. Exemplary compositions which can be used in the process of the invention include those compositions disclosed in U.S. Pat. No. 3,380,818, those compositions disclosed in U.S. Ser. No. 464,147 filed June 15, 1965, and corresponding British Patents 1,124,001 and 1,124,002, dated Dec. 9, 1968, and also those compositions disclosed in application Ser. No. 866,168 filed Oct. 13, 1969, and corresponding Netherlands printed patent application 6,805,259.

As exemplary of suitable matrix tube compositions, the following specific formulations are presented:

TABLE I
EXAMPLES OF SUITABLE MATRIX TUBE COMPOSITIONS

| INGREDIENT | WEIGHT PERCENT | | | |
|---|---|---|---|---|
| | I | II | III | IV |
| $SiO_2$ | 73.0 | 75.8 | 70.6 | 68.6 |
| $Al_2O_3$ | 17.65 | 16.8 | 19.7 | 21.3 |
| $Li_2O$ | 4.15 | 4.44 | 3.7 | 4.0 |
| ZnO | 1.7 | | 1.7 | |
| $TiO_2$ | 1.4 | 1.84 | 1.7 | 2.0 |
| $ZrO_2$ | 1.6 | 1.17 | 1.5 | 1.6 |
| $Na_2O$ | 0.1 | 0.55 | 0.4 | 0.4 |
| $Cl_2$ | 0.1 | | 0.1 | |
| $Sb_2O_3$ | 0.3 | | 0.5 | 0.3 |
| $K_2O$ | | | 0.2 | 0.2 |
| $F_2$ | | | 0.1 | |
| MgO | | | | 0.1 |

As exemplary of suitable frit compositions which can be utilized, the following compositions are presented:

TABLE II
EXAMPLES OF SUITABLE FRIT COMPOSITIONS

| INGREDIENT | WEIGHT PERCENT | | |
|---|---|---|---|
| | I | II | III |
| $SiO_2$ | 56.1 | 75.8 | 73.0 |
| $Al_2O_3$ | 25.5 | 16.8 | 17.65 |
| $B_2O_3$ | 2.2 | | |
| $Fe_2O_3$ | 0.03 | | |
| $TiO_2$ | 0.14 | 1.84 | 1.4 |
| $ZrO_2$ | 2.67 | 1.17 | 1.6 |
| PbO | 0.50 | | |
| CaO | 0.01 | | |
| MgO | 0.02 | | |
| ZnO | 0.04 | | 1.7 |
| $Na_2O$ | 0.9 | 0.55 | 0.1 |
| $K_2O$ | 4.10 | | |
| $Li_2O$ | 8.0 | 4.44 | 4.15 |
| $F_2$ | 0.13 | | |
| $Cl_2$ | | | 0.1 |
| $Sb_2O_3$ | | | 0.3 |

In any event, the thermally crystallizable glass tubings in the lithia-alumina-silica field containing nucleating agents as before described, are assembled as previously set forth and the constrained bundles of sealed tubing (containing a heat exapnsible fluid) are heated at any suitable rate that will not thermally shock the tubing up to a temperature range in the maximum nucleating range of the glass. The maximum nucleation range can be determined for all such glasses by the general method outlined in Smith U.S. Pat. No. 3,380,818 beginning at column 9, line 43.

For the process of the present invention where sealing is to be effected or initiated while nucleation is occurring, it is preferred that the assembled tubes be heated in the range $50°$ to $250°$ above the annealing point for a period of one hour or more. This time can be extended to 10 or 20 hours, and even longer times are not harmful. During this time of heating in such temperature range nucleation is effected, as well as fusion aided by pressure exerted by expansion of the entrapped fluid. Thereafter, the temperature is raised to a higher temperature than the first heating range, which higher temperature is at least $200°F$ above the annealing point temperature or may be as high as the final crystallization temperature (usually $1,800°$ to $2,300°F$). The final crystallization can be effected at any such temperature range higher than the nucleation-expansion-fusion temperature ($50°$ to $250°F$ above the annealing point temperature) and can be as low as $200°F$ above the annealing point or as high as $2,300°F$ or as high as the upper liquidus temperature. If the final crystallization is effected at temperatures no more than $400°$ or $500°F$ above the annealing point, then the product will not have as high temperature stability as is desired for gas turbine use, but the product will be of the desired low expansion glass-ceramic.

In any event, in this second stage of heating further expansion and the beginning of crystallization is effected, followed by the completion of crystallization on continued heating to a degree such that the matrix material has an expansion in the range from $-18$ to $50 + 50 \times 10^{-7}/°C$ over the range $0°$–$300°C$.

While the temperature may be raised directly to the final crystallization temperature at a furnace heating rate of at least $50°F$ per hour, it is usually preferred to allow crystallization to be effected slowly while further expansion and concomitant fusion is being effected by having an intermediate step between the first nucleation-and-fusion temperature range and the final crystallization temperature, which range is usually from $200°F$ to about $500°F$ above the annealing point of the original glass. Exemplary holding times in this intermediate range are from 1 to 8 hours, after which the assembly is heated up to the final crystallization temperature, usually in the range of from about $1,800°$ to $2,300°F$.

Obviously, no specific heat treatment instructions can be given suitable for all thermally crystallizable glass compositions. As is well known, glass-ceramics do not have adequate strength if they are not sufficiently nucleated before crystals are allowed to grow appreciably in size, so that routine experiments known to those skilled in the art are used to determine what length of time is best to obtain an adequate number of crystallization centers or nuclei in the glass in the nucleation temperature range of 50° to 250°F above the annealing point.

Another point that must be kept in mind is that, if it is an object to obtain appreciable expansion beyond that necessary to get good fusion between the tubes, in other words to get appreciable reshaping of the tubes to fill the interstices between the tubing, one should not raise the temperature too slowly when going from the nucleation temperature range to the intermediate range, since a rigid crystalline network may begin to set in and to prevent further expansion. It is found some compositions can be heated at a rate as low as 50°F per hour to this intermediate temperature range and still get sufficient expansion of the tubing effective to form the substantially hexagonal passages (round tubes used in close-packed configuration). On the other hand, some compositions have been found not to fully expand unless the heating rate from the initial nucleation-fusion temperature range to the intermediate temperature range is on the order of at least 200°F per hour and preferably at least 300°F per hour.

The length of time of heating in the final crystallization temperature range of 1,800°F to about 2,300°F is from one-half hour to 5 or 6 hours, although longer times are in no way deleterious. After the crystallization has been completed, the structure can be cooled at furnace rate or in air when the structure is of such low expansion that thermal shock will not harm it.

When making a regenerator having a rim or having a rim and a hub, the rim, as stated, can be made of a thermally crystallizable glass that is the restraining means in which the tubes are initially packed, and the rim can be heat treated concomitantly with the tubes which seal to the rim during the process.

If, however, a rim of considerable thickness is desired and rapid heating rates such as 200° or 300° F per hour are used in the heat treatment of the matrix as just described, the glass of the rim may crack from thermal shock. In such case it is possible to pre-heat treat the rim to a partially crystallized state until it is a relatively low expansion material having an expansion coefficient less than 20 to $25 \times 10^{-7}$/°C. This can be accomplished by using a suitable nucleation and crystallization heat treatment where the top crystallization temperature is on the order of 1,450° to 1,600°F and the crystallization is effected only long enough to bring the coefficient of expansion down to the desired range. This partially heat treated rim then can be used as the restraining means without fear of thermal shock. It is also possible to use a fully heat treated glass-ceramic rim or a fully formed and heat treated rim made of a low expansion sintered ceramic material known in the art, such as ceramic materials that can be made, for instance, from powdered petalite by suitable sintering methods known in the art. The paste pattern mixture may also be formed from such low expansion sinterable ceramic materials, if the thermal expansion characteristics are compatible with those of the matrix. What has been said with respect to the rim also applies to regenerators having a hub of ceramic or glass-ceramic material.

After the heat treatment just described, the product may now be cooled and the sealed ends of the tubes cut or ground away to open each tube to atmospheric pressure. Alternatively, if the intermediate step of heat treating is employed, the heat treatment can be interrupted after this intermediate step and cooled somewhat or even cooled to room temperature, and the ends of the tubes cut or ground away and opened to atmospheric pressure. Then the assembly can be heated up again into the final crystallization heat treatment range, where further crystallization is effected. As noted hereinbefore the paste patterns may be applied to this intermediate matrix form and the matrix and paste jointly thermally processed into a desired crystallization state. As will be understood by those skilled in the art, the crystals of the matrix after this second stage of heat treatment may be in the beta-eucryptite or beta-eucriptite-like state, as is referred to in the referenced Smith U.S. Pat. No. 3,380,818, and already be highly crystallized and of a low expansion. The final heat treatment will cause further crystallization and conversion of the eucryptite-like crystals to beta-spodumene or beta-spodumene-like crystals, as is also described in the cited Smith patent. The following examples will serve to illustrate the invention without in any way limiting it, since modifications will be readily apparent to those having ordinary skill in the art.

EXAMPLE I

Glass tubing formed from composition III of Table I having an average outside diameter of 0.030 inch, average inside diameter of 0.026 inch, and an average wall thickness of 0.002 inch and having an average length of 3.5 inches, the tubing having closed ends, are closely packed into a mold similar to that illustrated in FIG. 1. The tubing and ring mold are then combined into the assembly 25 of FIG. 4 and thermally processed in a furnace according to the schedule in Example III of the Pei application. The ends of the resulting matrix are ground open with a diamond abrasive wheel exposing an open end face similar to that illustrated in FIG. 10. A paste or slurry is mixed containing a powdered mixture of composition I of Table II of about 200 mesh fineness in a vehicle consisting of Amyl acetate with 1.2 percent nitrocellulose, in a ratio of 3.5:1 to 2:1 (by weight) solids to vehicle to prevent the paste from flowing too freely.

Figure 13:
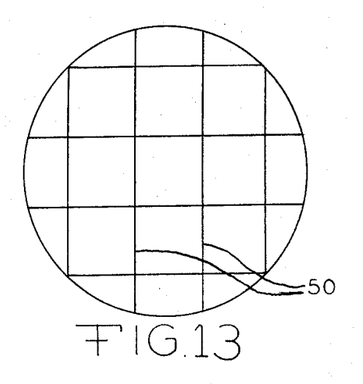
Figure 14:
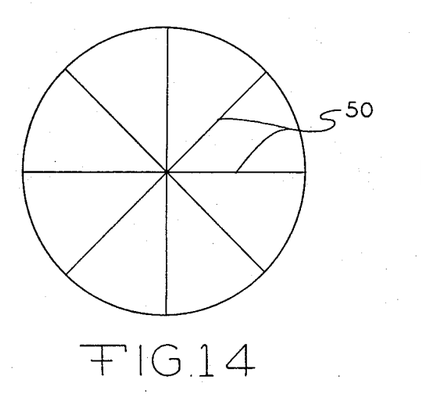
Figure 15:
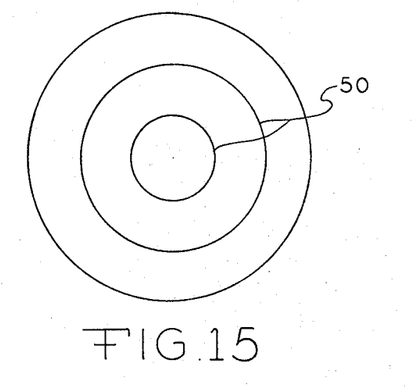
Figure 16:
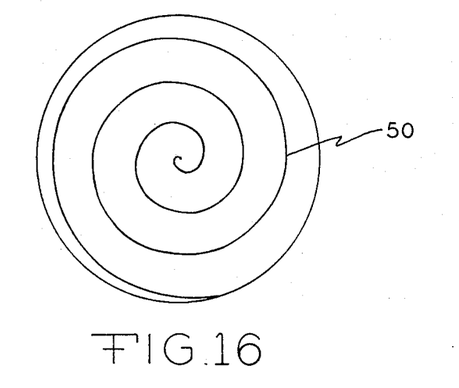

The paste-frit is then applied to the open face of the matrix in the grid pattern of FIG. 13, in strips about 0.25 inch wide. The matrix and paste-frit pattern are then heat treated in a furnace on the following schedule.

| Temperature | Time or Rate |
|---|---|
| Ambient to 2000°F | 100°F/Hr. |
| Hold at 2000°F | 2 to 4 hrs. |
| 2000°F to 1800°F | 50°F/Hr. |
| 1800°F to Ambient | 200°F/Hr. |

After this second heat treatment, the resulting glass-ceramic matrix may be used as a regenerator in one of the structural forms detailed in the Pei application. The foregoing first heat treatment thermally in situ crystallized the tubing and produced a glass-ceramic matrix. The second heat treatment fusion bonded with paste-frit to and just below the surface of the matrix in the open ends of tubes and interstices covered by the pattern. The normal open frontal area is reduced about 5 percent by the pattern and a wear-resistant reinforced surface is provided for contact with a seal bar to prevent fracturing or other destruction of the open ends of tubes not covered by the pattern. The reinforced surface has been thermally converted to a very low expansion glaze or ceramic which has thermal expansion characteristics compatible with the expansion characteristics of the matrix.

This example illustrates that a wear-resistant, porosity-controlling reinforcing surface may be provided for a matrix which has already been thermally processed to substantially complete crystallication before application of a paste-frit pattern to form the wear-resistant surface. The powdered low expansion crystallizable frit may consist of a mixture of two different compositions from Table II which have different coefficients of lineal thermal expansion to obtain a mixture having an overall coefficient of lineal thermal expansion which substantially matches the still different coefficient of lineal expansion of the tubing which is formed from composition III of Table I, when all have been thermally crystallized into the glass-ceramic matrix. Moreover, mixtures of different frit compositions may be used to obtain desirable or matching chemical characteristics.

EXAMPLE II

Glass tubing formed from composition I of Table I having an average outside diameter of 0.030 inch, average inside diameter of 0.026 inch, and an average wall thickness of 0.002 inch and having an average length of 3.5 inches, the tubing having closed ends, are closely packed into a mold similar to that illustrated in FIG. 1. The mold and tubes are then combined into the assembly 25 of FIG. 4 and heated in a furnace for the first step of the heat treatment process on the following schedule:

| Temperature | Time or Rate |
| --- | --- |
| Ambient to 900°F | 100°F per Hr. |
| Hold at 900°F | 2 hours |
| 900°F to 1300°F | 100°F per Hr. |
| 1300°F to 1375°F | 100°F per Hr. |
| Hold at 1375°F | 24 hours |
| 1375°F to 1725°F | 10°F per Hr. |
| Hold at 1725°F | 24 Hours |
| 1725°F to 1800°F | 5°F per Hr. |
| Hold at 1800°F | 6 Hours |
| 1800°F to 1500°F | 50°F per Hr. |
| 1500°F to Ambient | 150°per Hr. |

The tube ends are then cut off with a saw to expose an open end face of the matrix. A paste or slurry is mixed containing a finely divided frit of about 200 mesh consisting of composition III of Table II in a vehicle of amyl acetate with 1.2 percent nitrocellulose, in a ratio of 3.5:1 to 2:1 (by weight) solids to vehicle, again of a consistency to prevent the paste from flowing freely. The paste-frit is then applied to the open face of the matrix in the pinwheel pattern of FIG. 12, the pattern strips being about 0.25 inch wide.

A second step heat treatment schedule for the combined matrix and paste pattern assembly is as follows:

| Temperature | Time or Rate |
| --- | --- |
| Ambient to 1800°F | 100°F per Hr. |
| 1800°F to 2100°F | 50°F per Hr. |
| Hold at 2100°F | 6 hours |
| 2100°F to 1700°F | 50°F per Hr. |
| 1700°F to Ambient | 300°F per Hr. |

The annealing point of glass composition I is about 1,320°F.

After the foregoing second step heat treatment a glass-ceramic matrix results with wear-resistant, porosity controlling reinforcing surfaces and having the same structural and low expansion characteristics as those described for the matrix of EXAMPLE I.

This example is provided to illustrate that it is frequently desirable to use a frit composition for the paste which is the same as the composition of the glass tubing to obtain substantially the same coefficient of lineal expansion along the open ends of the tubing at the pattern on the face of the glass-ceramic matrix. This example further illustrates that a two step heat treatment may be used in which a constrained bundle of sealed tubing is first heated to expand or bloat the tubes for initial fusion and to heat the tubes to a temperature range in the maximum nucleation range. The first step induces a glassy sintering of the material, wherein the material is not fully crystallized, is partially transparent, and is in a high quartz form. The second step or final heat treatment converts the tubing into full opacity or substantially full crystallization as a glass-ceramic matrix and converts the paste-frit pattern into a glass-ceramic reinforcing surface that is fusion bonded to the matrix. This two step process is useful for materials that cannot stand the mechanical and chemical strains of the one step or "unified" heat treatment cycle described in EXAMPLE I.

The vehicle used for the slurrys in EXAMPLES I and II is exemplary only and was chosen for the characteristics of a good initial drying speed provided by the amyl acetate solvent for the nitrocellulose, and for the ability of the nitrocellulose to bind the frit particles together to provide good green-ware handling properties.

It should further be noted that ordinary sinterable ceramic powders having a very low expansion may be useful for certain paste applications. These powders will sinter or adhere together and to the open ends of the tubes and interstices creating a fusion chemical bond between particles and the tubes. While there is normally a reduction in size of these powdered particles when sintered, they can be used in the matrix formation herein by providing a paste strip build-up above the face of the matrix and then grinding the converted ceramic to face level, as long as the resultant thermal expansion and chemical characteristics are compatible with the tubing in the matrix.

For many applications, particularly when the matrix is used as a heat exchanger, a low expansion and heat/thermal shock resistant matrix is required. For instance, when used as a regenerator in a gas turbine, hot gas from the turbine can be passed through a rotating open-ended matrix in one direction, while cold incoming air is passed through the matrix in the opposite direction, picking up heat from the matrix passageways.

Therefore, a preferred embodiment of this invention utilizes thermally crystallizable glass compositions for the tubes which in their crystallized state, 1. have essentially zero porosity,
2. consist essentially of an inrganic crystalline oxide ceramic material,
3. have an average coefficient of lineal thermal expansion of about $-12$ to $+12 \times 10^{-7}/°C$ in a range $0°-300°C$, and preferably a coefficient of about $-5$ to $+5 \times 10^{-7}/°C$ in a range $0°-300°C$, and
4. a thermal conductivity of less than 0.01 cal/cm/sec/cm²/°C at 400°C.

When the matrix tubes have such a coefficient of expansion it is preferred, also, that the expansion coefficient of the paste-frit material also be in the $-12$ to $+12$ (preferably −5 to +5) × $10^{-7}/°C$ range over the temperature range 0°–300°C.

As used herein the term "glass-ceramic" is an inorganic crystalline oxide ceramic material containing a multiplicity of extremely small inorganic oxide crystals in random orientation throughout the mass of the material, which glass-ceramic is formed by the thermal in situ bulk crystallization of a glass.

Also as used herein the term "inner diameter" refers to the shortest distance through the center of the tube or passageway from one inner wall to the opposite inner wall. This distance is the same for all diameters of a circle, of course, but for a hexagon, for instance, the "diameter" defined herein is the distance of a line through the center of a hexagon and perpendicular to the opposite side walls of the hexagon.

It should be noted that both open-ended faces of a matrix may be similarly reinforced by the method described herein. The reinforcing surfaces for the opposing faces may be thermally processed simultaneously or at different times. It should also be noted that while it may be desirable for some aplications that the tube ends and interstices (if any) adjacent the pattern be completely filled with the reinforcing material after the thermal treatment is completed, the structure is functional if the tube ends and/or interstices are not filled, as long as a surface is present which will provide the desired wear-resistance and reinforcement.

While there have been shown and described and pointed out the fundamental novel features of the invention with a reference to the preferred embodiments thereof, those skilled in the art will recognize that various changes, substitutions, omissions and modifications in the methods and structures described may be made by those skilled in the art without departing from the spirit of the invention.

I claim:

1. A regenerator matrix comprising
   a. a plurality of open-ended tightly packed axially elongated tubes formed of ceramic material arranged with their axes substantially parallel and having adjacent tube walls joined together to form an integral mass having a series of longitudinal parallel passageways formed therethrough, and
   b. an open network pattern of sintered ceramic material on an open-ended face of said integral mass fusion bonded to open tube ends adjacent said pattern to provide a wear-resistant, reinforcing surface for said open end of said mass,
   c. said tubes and said sintered ceramic pattern having substantially the same thermal expansion characteristics.

2. A regenerator matrix as defined in claim 1 wherein the tube walls
   a. consist essentially of an inorganic crystalline oxide ceramic material, and
   b. have an average coefficient of lineal thermal expansion of about −18 to +50 × $10^{-7}/°C$ in the range 0°–300°C.

3. A regenerator as defined in claim 2 in which the sintered ceramic surface material
   a. consists essentially of an inorganic crystalline oxide ceramic material, and
   b. has an average coefficient of lineal thermal expansion of about −18 to +50 × $10^{-7}/°C$ in the range 0°–300°C.

4. A regenerator matrix as defined in claim 3 in which the tube walls and the sintered ceramic surface material have an average coefficient of lineal thermal expansion of about −12 to +12 × $10^{-7}/°C$ in the range 0°–300°C.

5. A regenerator matrix as defined in claim 3 in which the tube walls and the sintered ceramic surface material have an average coefficient of lineal thermal expansion of about −5 to +5 × $10^{-7}/°C$ in the range 0°–300°C.

6. A regenerator matrix as defined in claim 1 in which the tube walls have essentially zero porosity.

7. A regenerator matrix as defined in claim 1 in which the tube walls have a thermal conductivity of less than 0.01 cal/cm/sec/cm²°C.

8. A regenerator matrix as defined in claim 1 in which each tube has a ratio of inner diameter to wall thickness of at least 6.

9. A regenerator matrix as defined in claim 1 in which each tube has a ratio of inner diameter to wall thickness of at least 7.2.

* * * * *

PO-1050
(5/69)

UNITED STATES PATENT OFFICE
CERTIFICATE OF CORRECTION

Patent No. 3,771,592  Dated November 13, 1973

Inventor(s) JAMES A. SAYERS

It is certified that error appears in the above-identified patent and that said Letters Patent are hereby corrected as shown below:

Column 9, line 65, delete "$SiO_3$" and substitute

-- $SiO_2$ --.

Column 10, line 51, change "$50+50 \times 10^{-7}/°C$" to

-- $+50 \times 10^{-7}/°C$ --.

Column 12, line 63, delete "with" and substitute

-- the --.

Column 14, line 57, delete "inrganic" and substitute

-- inorganic --.

Column 16, line 16, (first line of claim 3)

after "regenerator" insert

-- matrix --.

Signed and sealed this 23rd day of April 1974.

(SEAL)
Attest:

EDWARD M. FLETCHER, JR.
Attesting Officer

C. MARSHALL DANN
Commissioner of Patents